United States Patent [19]
Guo

[11] Patent Number: 5,512,642
[45] Date of Patent: Apr. 30, 1996

[54] PROCESS FOR MAKING VINYL AROMATIC/ALKOXYLATED ALLYL ALCOHOL COPOLYMERS

[75] Inventor: Shao-Hua Guo, West Goshen, Pa.

[73] Assignee: Arco Chemical Technology, Greenville, Del.

[21] Appl. No.: 418,312

[22] Filed: Apr. 7, 1995

Related U.S. Application Data

[62] Division of Ser. No. 271,306, Jul. 6, 1994, Pat. No. 5,444, 141.

[51] Int. Cl.[6] .................... C08F 216/08; C08F 216/12; C08F 212/08
[52] U.S. Cl. ................... 526/79; 526/86; 526/87; 526/332; 526/333; 526/347; 526/227
[58] Field of Search .................. 526/79, 332, 333, 526/347, 86, 87

[56] References Cited

U.S. PATENT DOCUMENTS

| | | |
|---|---|---|
| 2,630,430 | 3/1953 | Shokal . |
| 2,894,938 | 7/1959 | Chapin et al. . |
| 2,940,946 | 10/1960 | Shokal et al. . |
| 2,965,615 | 12/1960 | Tess et al. . |
| 3,080,348 | 3/1963 | Lang ........................ 526/86 |
| 3,268,561 | 8/1966 | Peppel et al. . |
| 4,200,593 | 4/1980 | van de Loos ............ 525/243 |
| 4,278,782 | 7/1981 | Heaps ...................... 526/326 |
| 4,367,320 | 1/1983 | Murray ..................... 526/75 |
| 4,618,703 | 10/1986 | Thanawalla et al. ...... 560/209 |
| 5,382,642 | 1/1995 | Guo ......................... 526/333 |

*Primary Examiner*—Fred Zitomer
*Attorney, Agent, or Firm*—Jonathan L. Schuchardt

[57] ABSTRACT

An improved process for making vinyl aromatic/allylic alcohol copolymers is disclosed. Gradual addition of a free-radical initiator during the course of the polymerization results in a substantial increase in the polymer yield obtained compared with the yield from conventional processes in which all of the free-radical initiator is charged initially. The process is particularly useful for making commercially important varieties of styrene-allyl alcohol copolymers.

12 Claims, No Drawings

PROCESS FOR MAKING VINYL AROMATIC/ALKOXYLATED ALLYL ALCOHOL COPOLYMERS

This is a division of application Ser. No. 08/271,306 filed Jul. 6, 1994, now U.S. Pat. No. 5,444,141.

FIELD OF THE INVENTION

The invention relates to vinyl aromatic/allylic alcohol copolymers such as styrene-allyl alcohol copolymers. In particular, the invention is an improved process that gives enhanced yields of these copolymers, including the commercially important varieties of styrene-allyl alcohol copolymers. The copolymers are especially valuable in the coatings industry.

BACKGROUND OF THE INVENTION

Styrene-allyl alcohol copolymers are resinous polyols of intermediate molecular weight that are particularly useful for polyesters, fatty ester emulsions, alkyd and uralkyd coatings, and polyurethanes. The most useful styrene-allyl alcohol copolymers known have number average molecular weights of about 800 to 2000 and hydroxyl numbers within the range of about 180–280 mg KOH/g.

Styrene-allyl alcohol copolymers can be made in a batch process by charging a reactor with styrene, allyl alcohol, and a free-radical initiator (such as a peroxide), and heating the mixture at a temperature effective to polymerize the monomers (usually 100°–300° C.). Typical processes are described in U.S. Pat. Nos. 2,630,430, 2,894,938, and 2,940,946, the teachings of which are incorporated herein by reference.

Because of the large reactivity difference between the monomers, a continuous or a semi-batch process is typically used. In the semi-batch process, for example, all of the required allyl alcohol and free-radical initiator are charged to the reactor at the start of the polymerization along with a portion of the styrene to be used (see Example I in U.S. Pat. No. 2,940,946). Most of the styrene is added gradually to the reactor to maintain an excess of allyl alcohol in the reactor. The semi-batch method allows preparation of useful styrene-allyl alcohol copolymers, i.e., copolymers having 15–30 wt. % of recurring units derived from allyl alcohol, average hydroxyl functionalities from about 2 to 6, and hydroxyl numbers in the 180–280 mg KOH/g range.

The conventional semi-batch process gives yields of only about 20–30%, and thus requires recycling of at least about 70 wt. % of the reaction mixture. The yield of polymer product can be increased, but usually only at the expense of making a product having a higher styrene content, lower hydroxyl number, etc., a product that lacks utility for most of the targeted end-use applications.

Still needed in the art is an improved process for making vinyl aromatic/allylic alcohol copolymers, especially styrene-allyl alcohol copolymers. A preferred process would give higher yields of copolymers having desirable molecular weights, hydroxyl numbers, hydroxyl functionalities, and allylic alcohol content. Preferably, the process would be easy to perform, would use conventional equipment, and would be cost-effective.

SUMMARY OF THE INVENTION

The invention is a semi-batch process for making vinyl aromatic/allylic alcohol copolymers. The process comprises charging a reactor with an allylic alcohol, 10–30% of the total amount to be used of a vinyl aromatic monomer, and 45–75% of the total amount to be used of a free-radical initiator. The mixture is heated at a temperature within the range of about 125° C. to about 185° C. The remaining 70–90% of the vinyl aromatic monomer and 25–55% of the free-radical initiator are added gradually to the reaction mixture at a decreasing rate. The mole ratio of vinyl aromatic monomer to allylic alcohol used in the process is within the range of about 0.1 to about 0.5.

The resulting product is a vinyl aromatic/allylic alcohol copolymer having a number average molecular weight within the range of about 800 to about 2000 and a hydroxyl number within the range of about 180 mg KOH/g to about 280 mg KOH/g.

I surprisingly found that selection of these conditions, which include a gradual addition of the free-radical initiator during the course of the polymerization, results in a substantial increase in the yield of vinyl aromatic/allylic alcohol copolymer compared with the yield obtained from a conventional process in which all of the free-radical initiator is charged initially to the reactor. Copolymers prepared by the process are valuable for polyesters, fatty ester emulsions, alkyd and uralkyd coatings, and polyurethanes. The process is well-suited for the manufacture of commercially important styrene-allyl alcohol copolymers.

DETAILED DESCRIPTION OF THE INVENTION

The invention is a semi-batch process for making copolymers derived from vinyl aromatic monomers and allylic alcohols.

Vinyl aromatic monomers useful in the invention are aromatic compounds that have a $-CH=CH_2$ group attached to an aromatic ring. Suitable vinyl aromatic monomers include, but are not limited to, styrene, alkyl-substituted styrenes (e.g., 4-methylstyrene, 4-tert-butylstyrene, 2,6-dimethylstyrene), halogenated styrenes (e.g., 4-chlorostyrene, dichlorostyrenes, dibromostyrenes, tribromostyrenes), vinyl naphthalenes, and the like, and mixtures thereof. A minor proportion of a di- or polyvinyl aromatic monomer such as divinylbenzene can be included if a greater degree of crosslinking is desired, although preferably only a monovinyl aromatic monomer is used. Styrene and halogenated styrenes are preferred vinyl aromatic monomers.

An allylic alcohol is also used in the process. Preferred allylic alcohols have the general structure $CH_2=CR-CH_2-OH$, in which R is hydrogen or a $C_1-C_{10}$ alkyl group. Suitable allylic alcohols include, for example, allyl alcohol, methallyl alcohol, 2-ethyl-2-propen-1-ol, 2-pentyl-2-propen-1-ol, and the like, and mixtures thereof. Allyl alcohol and methallyl alcohol are particularly preferred.

Suitable allylic alcohols also include alkoxylated allylic alcohols of the formula $CH_2=CR'-CH_2-(A)_n-OH$ in which R' is hydrogen or methyl, A is a $C_2-C_4$ oxyalkylene group, and n, which is the average number of oxyalkylene units in the alkoxylated allylic alcohol, has a value less than or equal to 5. Suitable propoxylated allyl alcohols can be made, for example, by reacting allyl alcohol with up to 5 equivalents of propylene oxide in the presence of a basic catalyst, as is described in U.S. Pat. Nos. 3,268,561 and 4,618,703, the teachings of which are incorporated herein by reference. Particularly preferred are propoxylated allyl alcohols for which n has a value within the range of about 1 to 2.

The mole ratio of vinyl aromatic monomer to allylic alcohol used in the process is within the range of about 0.1 to about 0.5. An excess of the allylic alcohol is needed to give copolymers having an adequate proportion of allylic alcohol recurring units.

A free-radical initiator is included in the process of the invention. Suitable free-radical initiators are the peroxide and azo-type initiators well known to those skilled in the art. High-temperature peroxide initiators are preferred. Examples include di-tert-butylperoxide, tert-butyihydroperoxide, tert-butylperbenzoate, cumene hydroperoxide, and the like.

The free-radical initiator is used in an amount effective to copolymerize the vinyl aromatic monomer and allylic alcohol. The actual amount used varies depending upon many factors, including which free-radical initiator is used, which monomers are present, reaction temperature, desired reaction time, the desired molecular weight and functionality of the polymer, and other factors. Generally, the total amount of free-radical initiator used is greater than about 1 wt. % based on the total weight of monomers. Preferably, an amount within the range of about 2 wt. % to about 35 wt. % based on the total weight of monomers is used; a more preferred range is from about 3 wt. % to about 15 wt. %.

Generally, the process of the invention is practiced as follows. A reactor is first charged with the allylic alcohol, 10–30% of the total amount to be used of the vinyl aromatic monomer, and 45–75% of the total amount to be used of the free-radical initiator. The mixture is heated at a temperature within the range of about 125° C. to about 185° C. The remaining 70–90% of vinyl aromatic monomer and 25–55% of free-radical initiator are then gradually added to the reaction mixture at a decreasing rate while polymerization proceeds. The resulting product is a vinyl aromatic/allylic alcohol copolymer having a number average molecular weight within the range of about 800 to about 2000 and a hydroxyl number within the range of about 180 mg KOH/g to about 280 mg KOH/g. Gradual addition of the free-radical initiator results in an enhanced yield of the copolymer.

The process of the invention is well-suited to the preparation of styrene-allyl alcohol (SAA) copolymers. At least two general types of SAA copolymers are commercially useful intermediates for making a variety of compositions, including polyesters, alkyd and uralkyd coatings, and polyurethanes. One type, known generally as the "SAA 100" type, has a hydroxyl number of about 200 mg KOH/g, and a number average molecular weight of about 1500. Another is the "SAA 101" type copolymer, which has a hydroxyl number of about 260 mg KOH/g, and a number average molecular weight of about 1200.

A conventional process for making these SAA copolymers involves gradually adding styrene at a decreasing rate to a reaction mixture that contains allyl alcohol and a peroxide initiator (see Example I, U.S. Pat. No. 2,940,946). All of the peroxide initiator is normally charged at the start of the polymerization, and the polymer yield is typically 20% ("SAA 101" product) to 30% ("SAA 100" product).

I unexpectedly found that the yield of vinyl aromatic/allylic alcohol copolymer improves substantially if both the vinyl aromatic monomer and the free-radical initiator are added gradually at a decreasing rate to the reaction mixture. The increase in yield resulting from the process of the invention compared with the conventional process (in which all of the free-radical initiator charged at the start of the polymerization) is typically more than 30% for the "SAA 100" product, and more than 50% for the "SAA 101" product. These substantial yield improvements make the process much more economically attractive.

The process of the invention can be used to make both the "SAA 100" and "SAA 101" type copolymers. The key difference in making one or the other is in controlling the mole ratio of styrene to allyl alcohol. If an "SAA 100" type copolymer is desired, the mole ratio of styrene to allyl alcohol should be within the range of about 0.3 to about 0.4. If an "SAA 101" type copolymer is desired, the mole ratio of styrene to allyl alcohol is preferably within the range of about 0.15 to about 0.25.

When an "SAA 100" type copolymer is desired (i.e., a styrene-allyl alcohol copolymer having a hydroxyl number of about 200 mg KOH/g, and a number average molecular weight of about 1500), the reactor is initially charged with allyl alcohol, 10–30% (preferably 20–25%) of the total amount to be used of styrene, and 45–75% (preferably 60–70%) of the total amount to be used of the free-radical initiator. The reaction mixture is heated at a temperature within the range of about 125° C. to about 185° C., preferably from about 135° C. to about 165° C. The remaining 70–90% of styrene (preferably 75–80%) and 25–55% (preferably 30–40%) of free-radical initiator are gradually added to the reaction mixture at a decreasing rate. The resulting styrene-allyl alcohol copolymer has a number average molecular weight within the range of about 1200 to about 1800 (preferably 1400 to 1600) and a hydroxyl number within the range of about 180 mg KOH/g to about 220 mg KOH/g (preferably 190 to 210 mg KOH/g).

When an "SAA 101" type copolymer is desired (i.e., a styrene-allyl alcohol copolymer having a hydroxyl number of about 260 mg KOH/g, and a number average molecular weight of about 1200), the process is performed in essentially the same way, but the mole ratio of styrene to allyl alcohol is changed as described earlier so that the resulting styrene-allyl alcohol copolymer has a number average molecular weight within the range of about 800 to about 1400 (preferably 1000 to 1200) and a hydroxyl number within the range of about 240 mg KOH/g to about 280 mg KOH/g (preferably 255 to 265 mg KOH/g).

The invention allows substantially higher yields (typically 30–50% higher) of styrene-allyl alcohol copolymers than were available from conventional processes in which all of the free-radical initiator is charged at the start of the polymerization. The yield increases mean higher operating efficiency, less unreacted monomer to recover and recycle, and more product from each cycle. Importantly, the process increases yields without adversely affecting the copolymer structure, molecular weight, or hydroxyl functionality: the products obtained meet the target specifications for a variety of end uses.

The vinyl aromatic/allylic alcohol copolymers made by the process of the invention are useful intermediates for preparing a variety of derivatives. Copolymers made using the process of the invention can be used in alkyd resins. The copolymer is combined with glycerin or another polyol and is partially esterified with a fatty acid to give an alkyd resin. In addition, the copolymers are useful in uralkyd compositions, melamine-based coatings, polyurethanes, and unsaturated polyester resins. Each of these applications is described in more detail in copending application Ser. No. 08/098,114, now allowed, the teachings of which are incorporated herein by reference. The following examples merely illustrate the invention. Those skilled in the art will recognize many variations that are within the spirit of the invention and scope of the claims.

EXAMPLE 1

Preparation of a Styrene-Allyl Alcohol Copolymer (number average mol. wt. about 1500, hydroxyl number about 200 mg KOH/g) Gradual addition of Di-tert-butylperoxide Allyl alcohol (500 g), styrene (67 g), and di-tert-butylperoxide (16 g) are charged to a one-liter stainless-steel reactor equipped with addition pump, agitator, steam heating jacket, temperature controller, and inlets for nitrogen or vacuum. After purging three times with nitrogen, the reactor is sealed, and the contents are heated to 145° C. Di-tert-butylperoxide (8 g) is mixed with styrene (234 g), and this mixture is pumped into the reactor over 7 h at 145° C. at a decreasing rate.

The addition rates are as follows: 50 g/h for the first hour, 45 g/h for the second hour, 40 g/h for the third hour, 35 g/h for the fourth hour, 30 g/h for the fifth hour, 24 g/h for the sixth hour, and 18 g,/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 322 g of a styrene-allyl alcohol copolymer (40% yield based on the total weight of monomers), is isolated and characterized (hydroxyl number=199 mg KOH/g; Mn=1500; Mw=3400).

COMPARATIVE EXAMPLE 2

Preparation of a Styrene-Allyl Alcohol Copolymer (number average mol. wt. about 1500, hydroxyl number about 200 mg KOH/g) All of the Di-tert-butylperoxide Charged at the Start of the Polymerization Allyl alcohol (500 g), styrene (67 g), and di-tert-butylperoxide (16 g) are charged to a one-liter stainless-steel reactor equipped as in Example 1. After purging three times with nitrogen, the reactor is sealed, and the contents are heated to 135° C. Styrene (134 g) is pumped into the reactor over 5 h at 135° C. at a decreasing rate.

The addition rates are as follows: 48 g/h for the first hour, 32 g/h for the second hour, 24 g/h for the third hour, 18 g/h for the fourth hour, and 12 g/h for the fifth hour. Heating continues at 135° C. for an additional 0.5 h.

Unreacted monomers are removed from the product by vacuum distillation. The last traces of unreacted monomers are removed by addition of water and stripping under vacuum. The product, 208 g of a styrene-allyl alcohol copolymer (30% yield based on the total weight of monomers), is isolated and characterized (hydroxyl number=195 mg KOH/g; Mn=1430; Mw=3400). This process gives on-spec product, but in lower yield compared with Example 1.

COMPARATIVE EXAMPLE 3

Preparation of a Styrene-Allyl Alcohol Copolymer (number average mol. wt. about 150.0, hydroxyl number about 200 mg KOH/g) All of the Di-tert-butylperoxide Charged at the Start of the Polymerization The procedure of Comparative Example 2 is repeated, except that the polymerization is performed at 145° C. instead of 135° C. The product, 204 g of a styrene-allyl alcohol copolymer (29% yield based on the total weight of monomers), is isolated and characterized (hydroxyl number=236 mg KOH/g; Mn=1200; Mw=2250). The process gives an off-spec product in low yield.

COMPARATIVE EXAMPLE 4

Preparation of a Styrene-Allyl Alcohol Copolymer (number average mol. wt. about 1500. hydroxyl number about 200 m.g KOH/g) All of the Di-tert-butylperoxide Charged at the Start of the Polymerization The procedure of Example 1 is repeated except that all of the di-tertbutylperoxide (24 g) is charged to the reactor at the start of the polymerization. The product, 252 g of a styrene-allyl alcohol copolymer (31% yield based on the total weight of monomers), is isolated and characterized (hydroxyl number=170 mg KOH/g; Mn=1870; Mw=4060). The process gives an off-spec product in low yield.

Example 1 and Comparative Examples 2–4 show that a 33% increase in yield (from about 30% to 40%) is available from a process in which the di-tertbutylperoxide is added gradually during the course of the polymerization (Example 1) compared with the process in which all of the free-radical initiator is charged at the start of the polymerization (Comparative Examples 2–4). The target in each of these examples is an "SAA 100" type product, i.e., a styrene-allyl alcohol copolymer having a hydroxyl number of about 200 mg KOH/g, and a number average molecular weight of about 1500.

EXAMPLE 5

Preparation of a Styrene-Allyl Alcohol Copolymer (number average mol. wt. about 1500, hydroxyl number about 200 mg KOH/g) Gradual addition of tert-Butylhydroperoxide Allyl alcohol (500 g), styrene (67 g), and tert-butylhydroperoxide (70 wt. % TBHP in water, 22.9 g) are charged to a one-liter stainless-steel reactor equipped as in Example 1. After purging three times with nitrogen, the reactor is sealed, and the contents are heated to 145° C. tert-Butylhydroperoxide (11.4 g) is mixed with styrene (234 g), and this mixture is pumped into the reactor over 7 h at 145° C. at a decreasing rate.

The addition rates are as follows: 51.4 g/h for the first hour, 46 g/h for the second hour, 41 g/h for the third hour, 35 g/h for the fourth hour, 30 g/h for the fifth hour, 24 g/h for the sixth hour, and 18 g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 334 g of a styrene-allyl alcohol copolymer (42% yield based on the total weight of monomers), is isolated and characterized (hydroxyl number=207 mg KOH/g; Mn=1340; Mw=3100).

COMPARATIVE EXAMPLE 6

Preparation of a Styrene-Allyl Alcohol Copolymer (number average mol. wt. about 1500, hydroxyl number about 200 mg KOH/g) All of the tert-Butyl hydroperoxide Charged at the Start of the Polymerization Allyl alcohol (500 g), styrene (67 g), and tert-butylhydroperoxide (22.9 g) are charged to a one-liter stainless-steel reactor equipped as in Example 1. After purging three times with nitrogen, the reactor is sealed, and the contents are heated to 135° C. Styrene (134 g) is pumped into the reactor over 5 h at 135° C. at a decreasing rate.

The addition rates are as follows: 48 g/h for the first hour, 32 g/h for the second hour, 24 g/h for the third hour, 18 g/h for the fourth hour, and 12 g/h for the fifth hour. Heating continues at 135° C. for an additional 0.5 h.

Unreacted monomers are removed from the product by vacuum distillation. The last traces of unreacted monomers are removed by addition of water and stripping under vacuum. The product, 191 g of a styrene-allyl alcohol copolymer (27% yield based on the total weight of monomers), is isolated and characterized (hydroxyl number=207 mg KOH/g; Mn=1390; Mw=3160). The process gives on-spec product, but in lower yield compared with Example 5.

COMPARATIVE EXAMPLE 7

Preparation of a Styrene-Allyl Alcohol Copolymer (number average mol. wt. about 1500, hydroxyl number about 200 mg KOH/g) All of the tert-Butylhydrperoxide Charged at the Start of the Polymerization The procedure of Comparative Example 6 is repeated, except that 34.3 g of 70% tert-butylhydroperoxide solution is used instead of 22.9 g. The product, 220 g of a styrene-allyl alcohol copolymer (31% yield based on the total weight of monomers), is isolated and characterized (hydroxyl number=222 mg KOH/g; Mn=1250; Mw=2900). An off-spec product is obtained in low yield.

Example 5 and Comparative Examples 6–7 show that a 33% increase in yield (from about 30% to 40%) is also available from a gradual addition process in which tert-butylhydroperoxide is the free-radical initiator.

EXAMPLE 8

Preparation of a Styrene-Allyl Alcohol Copolymer (number average mol. wt. about 1200, hydroxyl number about 260 mg KOH/g) Gradual addition of Di-tert-butylperoxide Allyl alcohol (500 g), styrene (43 g), and di-tert-butylperoxide (12 g) are charged to a one-liter stainless-steel reactor equipped as in Example 1. After purging three times with nitrogen, the reactor is sealed, and the contents are heated to 145° C. Di-tert-butylperoxide (6 g) is mixed with styrone (151 g), and this mixture is pumped into the reactor over 7 h at 145° C. at a decreasing rate.

The addition rates are as follows: 34 g/h for the first hour, 29 g/h for the second hour, 26 g/h for the third hour, 23 g/h for the fourth hour, 19 g/h for the fifth hour, 15 g/h for the sixth hour, and 11 g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 209 g of a styrene-allyl alcohol copolymer (30% yield based on the total weight of monomers), is isolated and characterized (hydroxyl number=251 mg KOH/g; Mn=1100; Mw=2260).

EXAMPLE 9

Preparation of a Styrene-Allyl Alcohol copolymer (number average mol. wt. about 1200, hydroxyl number about 2.60 mg KOH/g) Gradual addition of tert-Butylhydroperoxide Allyl alcohol (500 g), styrone (43 g), and 70% tert-butylhydroperoxide (17.2 g) are charged to a one-liter stainless-steel reactor equipped as in Example 1. After purging three times with nitrogen, the reactor is sealed, and the contents are heated to 145° C. Additional 70% tert-butylhydroperoxide (8.5 g) is mixed with styrone (150 g), and this mixture is pumped into the reactor over 7 h at 145° C. at a decreasing rate as described in Example 8. Heating continues at 145° C. for an additional 0.5 h.

Unreacted monomers are removed from the product by vacuum distillation. The last traces of unreacted monomers are removed by addition of water and stripping under vacuum. The product, 223 g of a styrene-allyl alcohol copolymer (32% yield based on the total weight of monomers), is isolated and characterized (hydroxyl number=260 mg KOH/g; Mn=1120; Mw=2300).

COMPARATIVE EXAMPLE 10

Preparation of a Styrene-Allyl Alcohol Copolymer (number average mol. wt. about 1200, hydroxyl number about 260 mg KOH/g) All of the tert-Butylhydroperoxide Charged at the Start of the Polymerization Allyl alcohol (500 g), styrene (43 g), and tert-butylhydroperoxide (17 g) are charged to a one-liter stainless-steel reactor equipped as in Example 1. After purging three times with nitrogen, the reactor is sealed, and the contents are heated to 145° C. Styrene (79 g) is pumped into the reactor over 5 h at 145° C. at a decreasing rate.

The addition rates are as follows: 28 g/h for the first hour, 20 g/h for the second hour, 14 g/h for the third hour, 10 g/h for the fourth hour, and 6.5 g/h for the fifth hour. Heating continues at 145° C. for an additional 0.5 h.

Unreacted monomers are removed from the product by vacuum distillation. The last traces of unreacted monomers are removed by addition of water and stripping under vacuum. The product, 129 g of a styrene-allyl alcohol copolymer (21% yield based on the total weight of monomers), is isolated and characterized (hydroxyl number=246 mg KOH/g; Mn=1220; Mw=2680).

Examples 8–9 and Comparative Example 10 also show an improvement in polymer yield (about 50% increase compared with the conventional process) when the process of the invention is used to make an "SAA 101" type product, i.e., a styrene-allyl alcohol copolymer having a hydroxyl number of about 260 mg KOH/g, and a number average molecular weight of about 1200.

EXAMPLE 11

Preparation of a Styrene-Methallyl Alcohol Copolymer Gradual addition of tert-Butylbydroperoxide Methallyl alcohol (435.5 g), styrene (58.5 g), and 70% tertbutylhydroperoxide (19.9 g) are charged to a one-liter stainless-steel reactor equipped as in Example 1. After purging three times with nitrogen, the reactor is sealed, and the contents are heated to 145° C. Additional tert-butylhydroperoxide (9.9 g) is mixed with styrene (204 g), and this mixture is pumped into the reactor over 7 h at 145° C. at a decreasing rate.

The addition rates are as follows: 44 g/h for the first hour, 40 g/h for the second hour, 35 g/h for the third hour. 31 g/h for the fourth hour, 26 g/h for the fifth hour, 21 g/h for the sixth hour, and 16.7g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 300 g of a styrene-methallyl alcohol copolymer (43% yield based on the total weight of monomers), is isolated and characterized (hydroxyl number=184 mg KOH/g; Mn=1480; Mw=3470).

The preceding examples are meant only as illustrations; the following claims define the scope of the invention.

TABLE 1

Preparation of Styrene-Allyl Alcohol Copolymers: Effect of Gradual Addition of Free-Radical Initiator

| Ex # | Initiator | Gradual addition? | Rxn Temp. (°C.) | Target OH # | Actual OH # | Target Mn | Actual Mn | % Yield |
|---|---|---|---|---|---|---|---|---|
| 1 | DTBP | Yes | 145 | "SAA 100" product, | 199 | "SAA 100" product, | 1500 | 40 |
| C2 | DTPB | No | 135 | OH# 200 mg KOH/g | 195 | Mn = 1500 | 1430 | 30 |
| C3 | DTPB | No | 145 | | 236 | | 1200 | 29 |
| C4 | DTPB | No | 145 | | 170 | | 1870 | 31 |
| 5 | TBHP | Yes | 145 | | 207 | | 1340 | 42 |
| C6 | TBHP | No | 135 | | 207 | | 1390 | 27 |
| C7 | TBHP | No | 135 | | 222 | | 1250 | 31 |
| 8 | DTBP | Yes | 145 | "SAA 101" product, | 251 | "SAA 101" product, | 1100 | 30 |
| 9 | TBHP | Yes | 145 | OH# 260 mg KOH/g | 260 | Mn = 1200 | 1120 | 32 |
| C10 | TBHP | No | 145 | | 246 | | 1220 | 21 |

C = comparative example
DTBP = di-tert-butylperoxide;
TBHP = 70% aq. tert-butylhydroperoxide

I claim:
1. A process for making a vinyl aromatic/alkoxylated allyl alcohol copolymer, said process comprising:
   (a) charging a reactor with:
      (i) an alkoxylated allyl alcohol of the formula:

$CH_2=CR'-CH_2-(A)_n-OH$ in which R' is selected from the group consisting of hydrogen and methyl, A is a $C_2-C_4$ oxyalkylene group, and n, which is the average number of oxyalkylene groups in the alkoxylated allyl alcohol, has a value less than or equal to 5;
      (ii) 10–30% of the total amount to be used of a vinyl aromatic monomer; and
      (iii) 45–75% of the total amount to be used of a free-radical initiator;
   (b) heating the reaction mixture at a temperature within the range of about 125° C. to about 185° C.; and
   (c) gradually adding to the reaction mixture, at a decreasing rate, the remaining 70–90% of vinyl aromatic monomer and 25–55% of free-radical initiator, to produce a vinyl aromatic/alkoxylated allyl alcohol copolymer having a number average molecular weight within the range of about 800 to about 2000 and a hydroxyl number within the range of about 180 to about 280 mg KOH/g;
   wherein the mole ratio of vinyl aromatic monomer to alkoxylated allyl alcohol used in the process is within the range of about 0.1 to about 0.5, and the yield of copolymer is enhanced as a result of gradual addition of the free-radical initiator.
2. The process of claim 1 wherein R' is hydrogen, and A is an oxypropylene group.
3. The process of claim 2 wherein n has a value within the range of about 1 to 2.
4. The process of claim 1 wherein the vinyl aromatic monomer is selected from the group consisting of styrene, alkylated styrenes, and halogenated styrenes.
5. The process of claim 1 wherein the free-radical initiator is selected from the group consisting of tert-butylperoxide, tert-butylhydroperoxide, tert-butylperbenzoate, and cumene hydroperoxide.
6. The process of claim 1 wherein the free-radical initiator is used in an amount within the range of about 3 to about 15 wt. % based on the total weight of monomers.
7. A process for making a vinyl aromatic/propoxylated allyl alcohol copolymer, said process comprising:
   (a) charging a reactor with:
      (i) a propoxylated allyl alcohol of the formula:

$CH_2=CH-CH_2-(A)_n-OH$ in which A is an oxypropylene group, and n, which is the average number of oxypropylene groups in the propoxylated allyl alcohol, has a value less than or equal to 5;
      (ii) 10–30% of the total amount to be used of a vinyl aromatic monomer; and
      (iii) 45–75% of the total amount to be used of a free-radical initiator;
   (b) heating the reaction mixture at a temperature within the range of about 125° C. to about 185° C.; and
   (c) gradually adding to the reaction mixture, at a decreasing rate, the remaining 70–90% of vinyl aromatic monomer and 25–55% of free-radical initiator, to produce a vinyl aromatic/propoxylated allyl alcohol copolymer having a number average molecular weight within the range of about 800 to about 2000 and a hydroxyl number within the range of about 180 to about 280 mg KOH/g;
   wherein the mole ratio of vinyl aromatic monomer to propoxylated allyl alcohol used in the process is within the range of about 0.1 to about 0.5, and the yield of copolymer is enhanced as a result of gradual addition of the free-radical initiator.
8. A process of claim 7 wherein n has a value within the range of about 1 to 2.
9. The process of claim 7 wherein the vinyl aromatic monomer is selected from the group consisting of styrene, alkylated styrenes, and halogenated styrenes.
10. The process of claim 7 wherein the free-radical initiator is selected from the group consisting of tert-butylperoxide, tert-butylhydroperoxide, tert-butylperbenzoate, and cumene hydroperoxide.
11. The process of claim 7 wherein the free-radical initiator is used in an amount within the range of about 3 to about 15 wt. % based on the total weight of monomers.
12. A process for making a styrene/propoxylated allyl alcohol copolymer, said process comprising:
   (a) charging a reactor with:
      (i) a propoxylated allyl alcohol of the formula:

$CH_2=CH-CH_2-(A)_n-OH$ in which A is an oxypropylene group, and n, which is the average number of oxypropylene groups in the propoxylated allyl alcohol, has a value within the range of about 1 to 2;
(ii) 10–30% of the total amount to be used of styrene; and
(iii) 45–75% of the total amount to be used of a free-radical initiator;

(b) heating the reaction mixture at a temperature within the range of about 125° C. to about 185° C.; and (c) gradually adding to the reaction mixture, at a decreasing rate, the remaining 70–90% of styrene and 25–55% of free-radical initiator, to produce a styrene/propoxylated allyl alcohol copolymer having a number average molecular weight within the range of about 800 to about 2000 and a hydroxyl number within the range of about 180 to about 280mg KOH/g;

wherein the mole ratio of styrene to propoxylated allyl alcohol used in the process is within the range of about 0.1 to about 0.5, and the yield of copolymer is enhanced as a result of gradual addition of the free-radical initiator.

* * * * *